United States Patent
Goto et al.

(10) Patent No.: US 6,760,150 B2
(45) Date of Patent: Jul. 6, 2004

(54) OPTICAL TRANSMITTING APPARATUS AND AN OPTICAL TRANSMITTING SYSTEM

(75) Inventors: Ryosuke Goto, Kawasaki (JP); Taizo Maeda, Kawasaki (JP); Kazuo Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 10/097,401

(22) Filed: Mar. 15, 2002

(65) Prior Publication Data

US 2003/0076578 A1 Apr. 24, 2003

(30) Foreign Application Priority Data

Oct. 15, 2001 (JP) ........................................ 2001-317111

(51) Int. Cl.$^7$ ................................................ H01S 3/00
(52) U.S. Cl. ................................................ 359/337.12
(58) Field of Search ........................... 359/337.12, 337, 359/337.4, 341.41, 337.5

(56) References Cited

U.S. PATENT DOCUMENTS

| | | | | |
|---|---|---|---|---|
| 6,215,584 | B1 * | 4/2001 | Yang et al. | 359/337.4 |
| 6,259,553 | B1 * | 7/2001 | Kinoshita | 359/337 |
| 6,359,727 | B1 * | 3/2002 | Nakazato | 359/337.4 |
| 6,388,801 | B1 * | 5/2002 | Sugaya et al. | 359/334 |
| 6,411,429 | B1 * | 6/2002 | Tomofuji et al. | 359/337 |
| 6,433,864 | B1 * | 8/2002 | Chung et al. | 356/73.1 |
| 6,441,952 | B1 * | 8/2002 | Duan et al. | 359/334 |
| 6,456,426 | B1 * | 9/2002 | Bolshtyansky et al. | 359/334 |
| 6,462,861 | B2 * | 10/2002 | Ohshima et al. | 359/334 |
| 6,525,873 | B2 * | 2/2003 | Gerrish et al. | 359/341.4 |
| 6,560,008 | B1 * | 5/2003 | Wada | 359/337 |
| 6,603,596 | B2 * | 8/2003 | Inagaki et al. | 359/341.4 |
| 2001/0030797 | A1 * | 10/2001 | Kosaka et al. | 359/337.5 |
| 2002/0044340 | A1 * | 4/2002 | Cavalliere et al. | 359/337 |
| 2002/0076159 | A1 * | 6/2002 | Kosaka et al. | 385/39 |
| 2003/0067670 | A1 * | 4/2003 | Pavel et al. | 359/337 |
| 2003/0099432 | A1 * | 5/2003 | Furuki et al. | 385/24 |

FOREIGN PATENT DOCUMENTS

| | | | | |
|---|---|---|---|---|
| JP | 2000-98433 | | 4/2000 | G02F/1/35 |
| JP | 2001109025 A | * | 4/2001 | G02F/1/35 |

* cited by examiner

*Primary Examiner*—Thomas G. Black
*Assistant Examiner*—Deandra M. Hughes
(74) *Attorney, Agent, or Firm*—Staas & Halsey LLP

(57) ABSTRACT

An optical transmitting apparatus having a first optical amplifier by which quality of an output optical signal after amplified is changed according to an amplification gain, a second optical amplifier by which quality of an output optical signal after amplified is changed according to an input level of an output optical signal from the first optical amplifier, and a controlling means for performing an adaptive control on an amplification gain of the first optical amplifier so that quality of an output optical signal from the second optical amplifier becomes maximum, thereby optimizing signal quality in the optical transmitting apparatus in a hybrid optical amplifier structure.

39 Claims, 11 Drawing Sheets

OPTICAL TRANSMITTING APPARATUS AND AN OPTICAL TRANSMITTING SYSTEM

BACKGROUND OF THE INVENTION (1) Field of the Invention

The present invention relates to an optical transmitting apparatus and an optical transmitting system. Particularly, the present invention relates to a technique for optimizing signal quality of an output optical signal of an optical amplifier in an optical transmitting apparatus or an optical transmitting system having the optical amplifier in a hybrid structure.

(2) Description of Related Art

With an increase in information communication quantity, development of optical fiber communication systems in large capacities and at low costs is lively in these years. For the purpose of increasing the capacity, there has been studied and developed a wavelength division multiplex (WDM: Wavelength Division Multiplex) transmission system which multiplexes optical signals at a plurality of wavelengths as a channel signal and transmits it. To realize a lower cost, there is a demand for a long-distance system, in which a distance (called a 3R section) between a terminal (terminal once converting an optical signal into an electric signal, and again regenerating the optical signal) to a terminal can be extended as much as possible.

In the latter, in order to extend the 3R section as much as possible, it is essential how low an optical noise level generating in an optical amplifier disposed in a regenerator can be suppressed. With regard to this point, distribution Raman amplifiers (DRAs) attract attention in recent years, which are tried to be introduced into real systems.

Optical signals are heretofore amplified intensively by an erbium doped fiber amplifier (EDFA) in a regenerator. However, the EDFA generates a relatively large amount of noise, although being able to amplify with a high gain, which is one of factors that limit a transmission distance of the whole system. Namely, even if an optical receiving terminal can receive an optical signal at a sufficient level (power) transmitted for a long distance, the terminal cannot normally demodulate the signal because of a poor optical signal to noise ratio (OSNR) representing quality of the received optical signal.

In order to avoid such phenomenon, a DRA is disposed in front of the EDFA, for example, as a structure of an optical amplifier (hereinafter referred as an amplifier structure) of a regenerator, a part of a transmission loss due to an optical transmission path (optical fiber) is compensated by the DRA, then the EDFA intensively amplifies the optical signal.

Advantage of this amplifier structure is that this amplifier structure is expected to improve the OSNR as compared with a system configured with only the EDFA, since the DRA can amplify with a lower noise than that of the EDFA because the DRA is an optical amplifier of a distribution amplifier type which distributively amplifies an optical signal using the optical transmission path although its gain is smaller than that of the EDFA.

FIG. 11 shows an example of WDM transmission system using a hybrid amplifier configured with a DRA and an EDFA as a regenerator. In the WDM transmission system shown in FIG. 11, optical signals each at a predetermined wavelength are generated by respecitve transponders (optical transmitters) 101 equal in number to multiplexed wavelengths, signal levels of the optical signals are adjusted by respective optical variable attenuators 102 each at a corresponding wavelength, and the optical signals are wavelength-multiplexed by an optical multiplexer 103 in an optical transmitting terminal 101, then sent as a WDM signal to an optical transmission path 500.

The WDM signal is transmitted to an optical receiving terminal 400 while being amplified by regenerators 200 and 300. Namely, a DRA 301 complimentarily amplifies the WDM signal with a low noise by distribution amplification to compensate a part of a transmission loss due to the optical transmission path 500, and EDFAs 201 and 302 intensively amplify the WDM signal to compensate a remaining transmission loss due to the opical transmission path 500, whereby the WDM signal is transmitted through the optical transmission path 500. Incidentally, the number of the regenerators 200 and 300 is determined according to a transmission distance between the optical transmission terminal 100 and the optical receiving terminal 400, and regenerating (amplifying) capacities of the regenerators 200 and 300.

When the above WDM signal is finally received by the optical receiving terminal 400, the WDM signal is demultiplexed into optical signals at respective wavelengths by an optical demultiplexer 401, and received by optical receivers 402 at respective wavelengths.

In the case of a hybrid optical amplifier using the DRA 301 and the EDFA 302 as described above, it is possible to arbitrarily set a set gain of the DRA 301 and a set gain of the EDFA 302 within certain ranges (input level operable ranges of the DRA 301 and the EDFA 302) by changing pumping conditions of them.

Generally, there is used a method of estimating a DRA gain fluctuation due to variations in transmission path loss immediately before the DRA 301 and variations in fiber parameters of the optical transmission path 500, and beforehand setting a pumping light power of the DRA 301 so that a range of the DRA gain fluctuation falls in the operating range (input dynamic range of the EDFA 302) of the EDFA 302.

An output level of the regenerator (hereinafter referred as a node) 200 or 300 is defined in consideration of a non-linear phenomenon generating on the transmission path, so that outputs of the EDFA 302 are required to be kept at a constant level (power). For this, as disclosed in Japanese Patent Laid-Open Publication No. 2000-98433, for example, there is proposed a technique (hereinafter referred as a known technique) of monitoring a level (power) of an output optical signal of the DRA or EDFA, feed-back-controlling a pumping light power of the DRA such that a level of the output optical signal (level of an input optical signal to the EDFA) is always constant, thereby controlling an output of the regenerator at a constant level.

However, operating conditions of the DRA 301 are determined by fiber parameters of the optical transmission path 500 in the above method of beforehand setting the pumping light power of the DRA 301. When considering characteristics of a total node of the DRA 301 plus EDFA 302, it is difficult to say that they operate in the optimum conditions from a viewpoint of OSNR.

The above described known technique is to feed-back-control the pumping light power of the DRA in order to control a level (power) of outputs of the regenerator at a defined constant level, which does not improve the OSNA. Accordingly, it is hardly said that the regenerator operates under conditions that the optimum OSNR of the whole node can be obtained, like the above pre-setting method.

In a WDM transmission system, a dispersion compensating fiber (DCF: Dispersion Compensating Fiber) is generally installed in a node, when it is necessary to compensate wavelength dispersion generating in a WDM signal due to a wavelength dependent transmission loss characteristic of the optical transmission path 500. As a position at which the dispersion compensating fiber is to be disposed, it is said that between stages of the EDFAs (structure in which the EDFAs are in two stages, and the DCF is interposed between the stages) is suitable. This is to prevent degradation of the OSNR due to a DCF loss as much as possible by interposing the DCF having a relatively large loss between the stages of the EDFAs.

In a hybrid optical amplifier structure, there is used a DRA with an optical fiber being as an amplification medium. As compared with a known node structure including only an EDFA, a level diagram of an optical signal in the node is largely different, so that it is not always optimum from a viewpoint of OSNR that the DCF is interposed between stages of the EDFA.

SUMMARY OF THE INVENTION

In the light of the above problems, and object of the present invention is to optimize optical signal quality (OSNR) in an optical transmitting apparatus in a hybrid optical amplifier structure.

To attain the above object, the present invention provides an optical transmitting apparatus comprising a first optical amplifier by which quality of an output optical signal after amplified is changed according to its amplification gain, a second optical amplifier by which quality of an output optical signal after amplified is changed according to an input level of the output optical signal from the first optical amplifier, and a controlling means for performing an adaptive control on the amplification gain of the first optical amplifier so that quality of the output optical signal outputted from the second optical amplifier becomes maximum.

In the optical transmitting apparatus according this invention structured as above, the above controlling means so controls an amplification gain of the first optical amplifier that output optical signal quality of the second optical amplifier becomes maximum. Accordingly, it is possible to optimize final quality of an output optical signal of the optical transmitting apparatus although an input level of an optical signal to the second optical amplifier is not always constant unlike a case where an amplification gain of the first optical amplifier is so controlled that an output optical signal level of the second optical amplifier is constant.

The above controlling means may comprise a control target value storing unit for storing an output optical signal level of the first optical amplifier, at which quality of the output optical signal of the second optical amplifier is maximum, beforehand determined as a control target value on the basis of a gain-to-noise characteristic of the first optical amplifier and an input level-to-noise characteristic of the second optical amplifier, and a first gain control unit for setting the amplification gain of the first optical amplifier on the basis of the control target value of the control target value storing unit.

By employing the above structure, the controlling means can realize optimization of output optical signal quality of the whole optical transmitting apparatus, using a simple control that an amplification gain of the first optical amplifier is set on the basis of the above control target value beforehand determined on the basis of a noise characteristic of each of the above optical amplifiers.

In this case, the above first gain control unit may comprise a level monitoring unit for monitoring an output optical signal level of the first optical amplifier, and a comparing unit for comparing the control target value of the control target value storing unit with an output optical signal level of the first optical amplifier monitored by the level monitoring unit, thereby controlling the amplification gain of the first optical amplifier so that a result of comparison by the comparing unit becomes minimum. Accordingly, even after the above amplification gain setting, it is possible to always maintain the output optical signal level of the first optical amplifier at an optimum value at which output optical signal quality of the second optical amplifier is maximum.

The above controlling means may comprise a control target value calculating mans for calculating the control target values for each of second optical amplifiers having a different input level-to-noise characteristic on the basis of the gain-to-noise characteristic of the first optical amplifier and the input level-to-noise characteristic of the second optical amplifier, and storing the control target values in the control target value storing unit. In this case, an amplification gain of the first optical amplifier is always controlled on the basis of quality of an actual output optical signal of the second optical amplifier, so that it is possible to optimize output optical signal quality of the whole transmitting apparatus even at a time of initial setting of an amplification gain of the first optical amplifier and in an operating state after the initial setting.

In an optical transmitting system according to the present invention, an optical regenerator comprises a first optical amplifier by which quality of an output optical signal after amplified is changed according to its amplification gain, and a second optical amplifier by which quality of an output optical signal after amplified is changed according to an input level of the output optical signal from the first optical amplifier, whereas an optical receiver comprises an optical signal quality monitoring unit for monitoring quality of a received optical signal, and a control unit for controlling the amplification gain of the first optical amplifier in the optical regenerator so that quality of the received optical signal monitored by the optical signal quality monitoring unit becomes maximum.

In the optical transmitting system according to this invention structured as above, an amplification gain of the first optical amplifier in the optical regenerator in the system is so controlled that quality of a received optical signal monitored in the optical receiver becomes maximum. Accordingly, it is possible to optimize quality of a received signal in the optical receiver, that is, quality of an optical signal of the whole transmitting system, without providing the above adaptive control function to each regenerator in the system.

The optical transmitting apparatus and the optical transmitting system according to this invention provide the following effects and advantages:

(1) An amplification gain of the first optical amplifier is not such controlled that a level of an output optical signal of the second optical amplifier is always constant, but such adaptively controlled that quality of an output optical signal outputted from the second optical amplifier becomes maximum. Accordingly, quality of an output optical signal of the whole transmitting apparatus can be in the bast state. This allows a transmission distance of an optical signal to be extended, and the optical transmitting system to be configured at a low cost.

(2) The above adaptive control can be realized by a simple control that an amplification gain of the first optical amplifier is set on the basis of a control target value beforehand determined on the basis of a noise characteristic of each of the optical amplifiers. Accordingly, it is possible to realize, in a simple structure, a gain control by which quality of an optical signal of the whole optical transmitting apparatus can be always optimized. This allows a reduction in size and cost of the controlling means, further of the optical transmitting apparatus.

(3) An output optical signal level of the first optical amplifier is monitored, the output optical signal level is compared with the above control target value, and an amplification gain of the first optical amplifier is such controlled that a result of the comparison is minimum. It is thereby possible to always maintain quality of an optical signal of the whole optical transmitting apparatus in the optimum state, thus the whole optical transmitting system can be operated in the best conditions with respect to the optical signal quality.

(4) The above control target value can be set to each of second optical amplifiers having different noise characteristics on the basis of a gain-to-noise characteristic of the first optical amplifier and an input level-to-noise characteristic of the second optical amplifier. Even when another second optical amplifier having a different noise characteristic is employed in the optical transmitting apparatus, it is possible to automatically optimize output optical signal quality of the whole optical transmitting apparatus, which largely contributes to improvement of flexibility in configuring the system.

(5) The above adaptive control can be realized by monitoring quality of an output optical signal of the second optical amplifier, and such controlling an amplification gain of the second optical amplifier that the quality becomes maximum. In this case, an amplification gain of the first optical amplifier is always controlled on the basis of actual quality of an output optical signal of the second optical signal. Accordingly, even at a time of initial setting of an amplification gain of the first optical amplifier and in an operating state after the initial setting, it is possible to optimize output optical signal quality of the whole optical transmitting apparatus.

(6) The adaptive control in this case can be realized by monitoring, for example, an error rate of an output optical signal of the second optical amplifier, and such controlling an amplification gain of the first optical amplifier that the error rate becomes minimum. In this case, it is possible to always reduce the signal error rate of the whole optical transmitting apparatus to the minimum, and optimize signal quality of the whole transmitting apparatus, as well.

(7) The above adaptive control can be realized by monitoring an optical signal-to-noise ratio of an output optical signal of the second optical amplifier by an optical spectrum analyzer or the like, and such controlling an amplification gain of the first optical amplifier that an actual optical signal-to-noise ratio becomes maximum. In this case, it is possible to always operate the optical transmitting apparatus in conditions that signal quality (optical signal-to-noise ratio) of an output optical signal of the whole optical transmitting apparatus is best.

(8) Further, the dispersion compensator for compensate wavelength dispersion of a wavelength-multiplexed optical signal is disposed at a position, at which quality of an output optical signal of the second optical amplifier is maximum, beforehand determined on the basis of a noise characteristic of each of the optical amplifiers, among a position in a front stage of the first optical amplifier, a position between the first optical amplifier and the second optical amplifier, and a position in a rear stage of the second optical amplifier. Even when it is necessary to compensate wavelength dispersion in the optical transmitting apparatus, wavelength dispersion can be compensated at an appropriate position from a viewpoint of output optical signal quality in the whole optical transmitting apparatus, and the optical transmitting apparatus can be operated in a state that the output optical signal quality of the whole optical transmitting apparatus is best.

(9) Particularly, when the above dispersion compensator is disposed at least in a front stage of the first optical amplifier or between the first optical amplifier and the second optical amplifier, it is possible to more improve output optical signal quality of the whole optical transmitting apparatus as compared with a case where the dispersion compensator is disposed at another position.

(10) The dispersion compensator may be divided and disposed at a plurality of positions among a position in a front stage of the first optical amplifier, a position between the first optical amplifier and the second optical amplifier, and a position in a rear stage of the second optical amplifier. In which case, it is possible to allow the output optical signal quality of the whole optical transmitting apparatus to be in the best conditions.

(11) When the dispersion compensator is divided and disposed at least at a position in a front stage of the first optical amplifier and a position between the first optical amplifier and the second optical amplifier, it is possible to more improve output optical signal quality of the whole optical transmitting apparatus than a case where the dispersion compensator is disposed at another position.

(12) When a Raman optical amplifier is employed as the above first optical amplifer, whereas a rare-earth-doped optical fiber amplifier is employed as the above second optical amplifier, it is possible to obtain the above effects and advantages more effectively.

(13) In the optical receiving terminal, quality of a received optical signal is monitored, and an amplification gain of the first optical amplifier in the optical regenerator is such controlled that the quality becomes maximum, as well. It is thereby possible to operate the whole optical transmitting system in the best conditions with respect to signal quality. In this case, a gain control on the first optical amplifier is intensively performed from the optical receiving terminal. Accordingly, it is unnecessary to provide the above adaptive control to each of the regenerators, which allows simplification of the optical regenerator and reduction in cost of the same, and reduction in size, cost and the like of the whole optical transmitting system.

DESCRIPTION OF THE PRFERRED EMBODIMENTS

[Embodiments of the Invention]

(A) Description of Basic Principle

Figure 1:
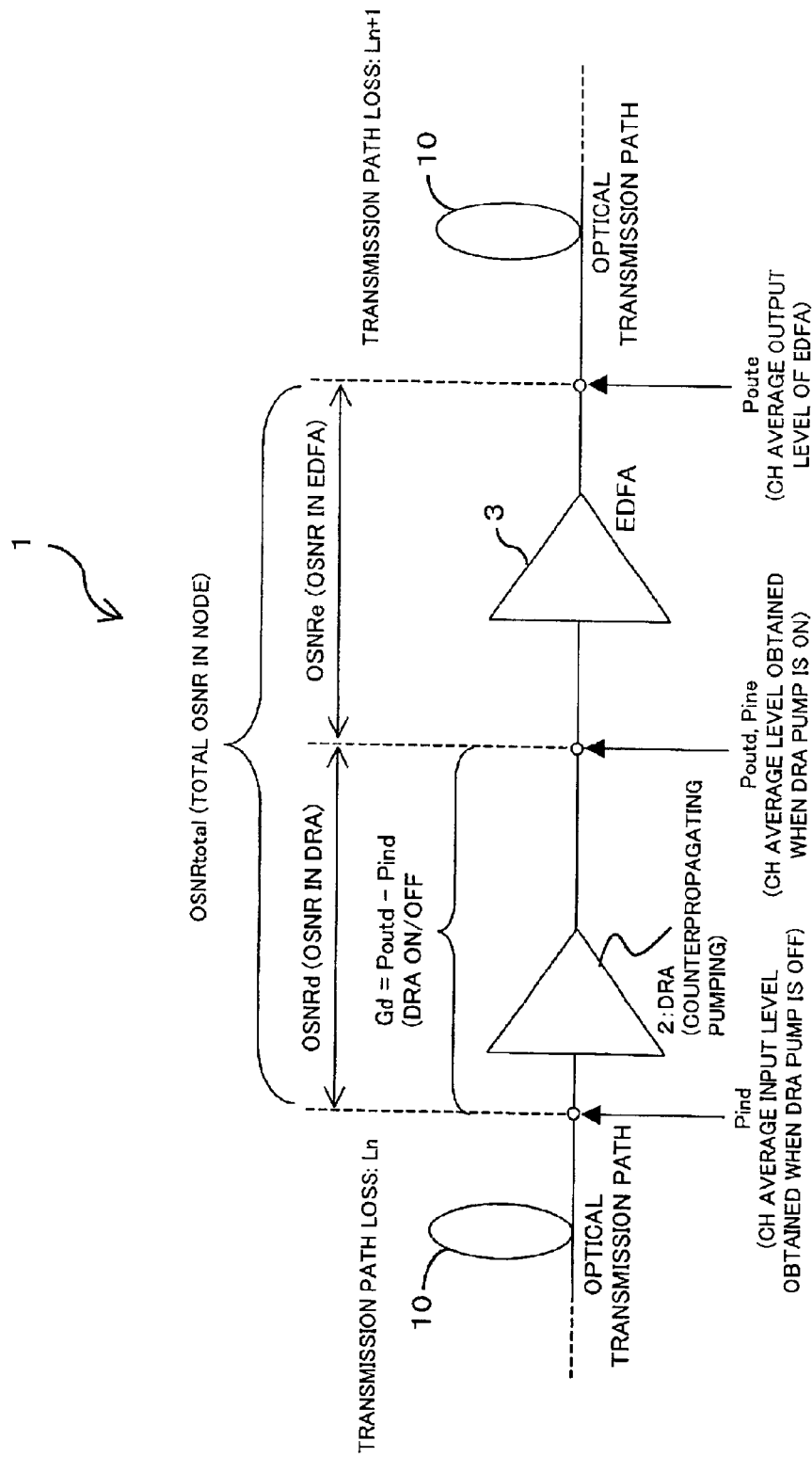
FIG. 1 is a block diagram showing a structure of a regenerator (optical transmitting apparatus) according to an embodiment of this invention.

FIG. 1 is a block diagram showing a structure of a regenerator (optical transmitting apparatus) according to an embodiment of this invention. As shown in FIG. 1, this regenerator 1 (hereinafter referred as a node 1, occasionally) is in a hybrid amplifier structure having a DRA 2 of a counterpropaging pumping type and an EDFA 3, in which a WDM signal from an optical transmission path 10 on the input's side is amplified by the DRA 2 and the EDFA 3.

Hereinafter, a method (basic principle) of optimizing an OSNR generating in a whole of the node 1 by adjusting an output level of the DRA 2 (=input level of the EDFA 3) by way of this structure.

As shown in FIG. 1, various parameters are defined as shown in Table below.

| PARAMETER | DEFINITION | UNIT |
|---|---|---|
| | DEFINITIONS OF VARIOUS PARAMETERS | |
| Pind | CHANNEL AVERAGE DRA INPUT LEVEL OBTAINED WHEN DRA PUMPING LIGHT IS OFF | dBm/ch |
| Poutd | CHANNEL AVERAGE DRA OUTPUT LEVEL OBTAINED WHEN DRA PUMPING LIGHT IS ON | dBm/ch |
| Pine | CHANNEL AVERAGE EDFA INPUT LEVEL OBTAINED WHEN DRA PUMPING LIGHT IS ON | dBm/ch |
| Poute | CHANNEL AVERAGE OUTPUT LEVEL OF EDFA 3 (= CHANNEL AVERAGE OUTPUT LEVEL OF NODE 1) | dBm/ch |
| Gd | ON/OFF GAIN OF DRA2 (= POUTD − PIND) | dB |
| OSNRtotal | OSNR IN THE WHOLE NODE 1 | dB |
| OSNRd | OSNR IN DRA 2 | dB |
| OSNRe | OSNR IN EDFA 3 | dB |
| Ln | TRANSMISSION PATH LOSS IMMEDIATELY BEFORE NODE 1 | dB |
| h | PLANK'S CONSTANT | |
| ν | PHOTON FREQUENCY | Hz |
| Δf | ASE MEASUREMENT RESOLVING POWER | Hz |

On the basis of the above definitions, an OSNR characteristic (OSNRtotal) generating in the whole node 1 is determined. First, an OSNR generating in the whole node can be expressed by the following equation (1) using an OSNR (=OSNRd) generating in the DRA 2 and an OSNR (=OSNRe) generating in the EDFA 3.

$$OSNRtotal = -10\log(10^{-(OSNRd/10)} + 10^{-(OSNRe/10)}) \ [dB] \quad (1)$$

where, an OSNR (=OSNRd) generating in the DRA 2 is expressed as:

$$OSNRd = Pind - NFd(Gd) - 10\log(h \cdot \nu \cdot \Delta f) \ [dB] \quad (2)$$

In the equation (2), Pind is expressed by the following equation (3):

$$Pind = Poute - Ln \ [dB] \quad (3)$$

Since a regenerator output level is kept at a constant value in a general optical transmitting apparatus, Poute is a fixed value. Assuming that a transmission path loss Ln immediately before the node 1 is a certain fixed value, Pind is considered to be a constant from the equation (3).

On the other hand, an OSNR (=OSNRe) generating in the EDFA 3 is expressed as:

$$OSNRe = Pine - NFe(Pin) - 10\log(h \cdot \nu \cdot \Delta f) \ [dB] \quad (4)$$

In the equation (4), Pine is expressed by the following equation (5):

$$Pine = Poutd = Pind + Gd \ [dBm/ch] \quad (5)$$

If Pind is considered to be a constant like the equation (3), Pine can be considered to be a function of DRA on/off gain Gd.

By substituting the above equations (2) to (5) in the equation (1), a total OSNR (=OSNRtotal) generating in the node 1 is determined:

$$OSNRtotal = -10 log[10^{-\{(Pind-NFd(Gd)-10\ log(h \cdot v \cdot \Delta f)/10)\}} + 10^{-\{(Pind+Gd-NFe(Pind+Gd)-10\ log(h \cdot v \cdot \Delta f)/10)\}}] \ [dB] \quad (6)$$

An OSNRtotal can be expressed with a function of only a gain Gd of the DRA 2. This signifies that an OSNR of the whole node 1 is uniquely determined from a DRA on/off gain. It is seen from this that a DRA on/off gain can be set on the basis of a (OSNRtotal)-to-(DRA on/off gain) characteristic so that the OSNR total becomes best.

Figure 2A:
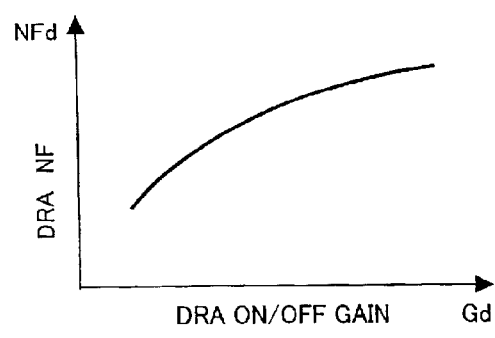
FIG. 2(A) is a diagram showing an example of NF (noise characteristic) of a DRA shown in FIG. 1.
Figure 2B:
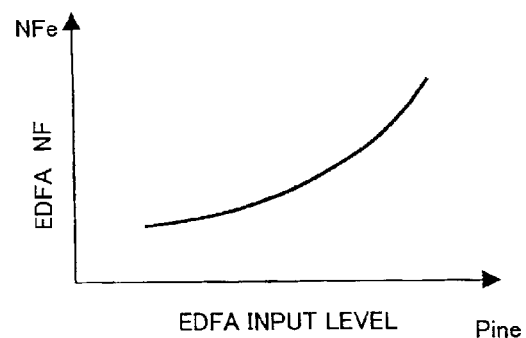
FIG. 2(B) is a diagram showing an example of NF of an EDFA shown in FIG. 1.
Figure 3:
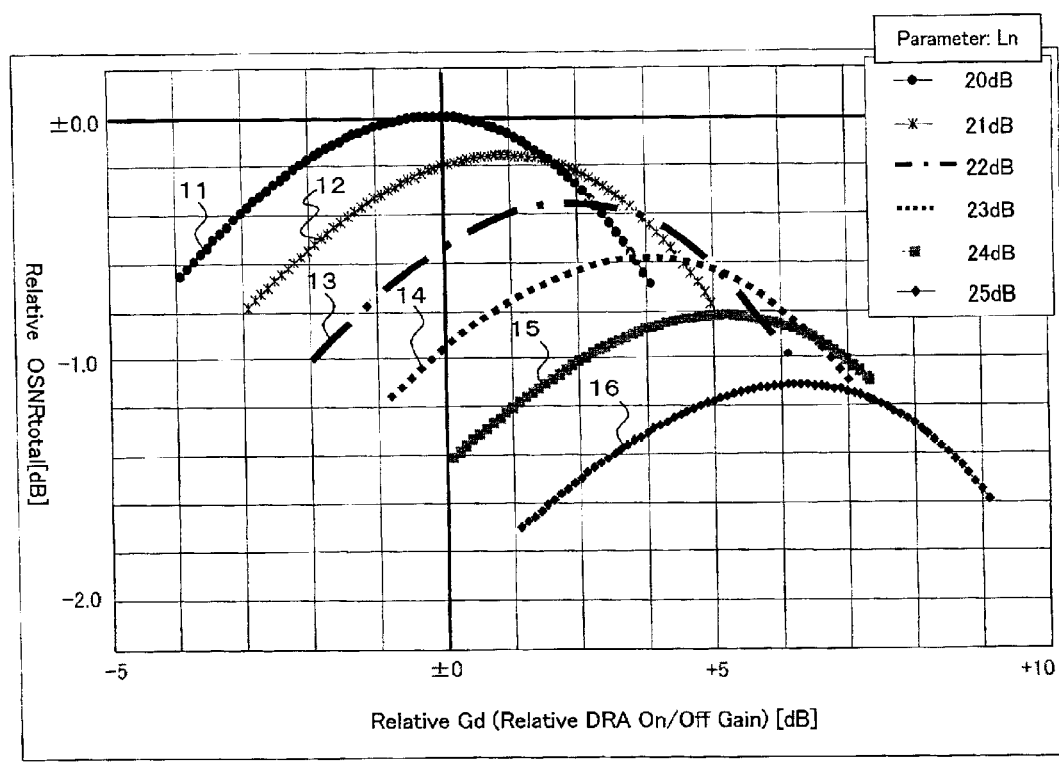
FIG. 3 is a diagram showing an example of results of calculation of OSNRs of a whole of an actual optical regenerator according to the embodiment.

FIG. 3 shows an example of results of actual calculation of OSNRtotals. FIG. 2(A) roughly shows a gain-to-noise characteristic [DRANF(Noise Figure):NFd(Gd)] of the DRA 2, and FIG. 2(B) roughly shows an input level-to-noise characteristic [EDFA NF:NFe(Pine)] of the EDFA 3. Namely, the DRA 2 has a characteristic that a noise component appearing in an output optical signal after amplified is changed according to an amplification gain of an input optical signal, thus signal quality of the output optical signal is changed. The EDFA 3 has a characteristic that a noise component appearing in an output optical signal after amplified is changed according to an input level of an input optical signal (output optical signal of the DRA 2), and signal quality of the output optical signal is changed.

As obvious from FIG. 3, it is seen that there is always a point at which the OSNRtotal becomes best to a certain DRA on/off gain when the transmission path loss Ln immediately before the node 1 is fixed. In FIG. 3, reference numeral 11 designates a gain-to-OSNR characteristic of the DRA 2 when Ln=20 dB, a reference character 12 designates the same when Ln=21 dB, a reference character 13 designates the same when Ln=22 dB, a reference character 14 designates the same when Ln=23 dB, a reference character 15 designates the same when Ln=24 dB, and a reference character 16 designates the same when Ln=25 dB (in an example of calculation in FIG. 3, an OSNRtotal and a Gd at a point where the OSNR is the largest in the case of Ln=22 dB being a reference, and relative values thereto being shown).

It is seen that the OSNR (=OSNRtotal) as a whole of the node 1 can be set to an optimum value by adjusting the on/off gain of the DRA 2 and optimizing the optical signal level (namely, the output level of the DRA 2) at a coupling point (amplifier coupling point) (namely, the output level of the DRA 2) between the DRA 2 and the EDFA 3.

When a transmission path loss Ln immediately before the node 1, an NF (input level-to-noise characteristic) of the EDFA 3 to be applied to the node 1, and an NF (gain-to-noise characteristic) of the DRA 2 to be applied to the node 1 are beforehand known, an output level (optimum value) of the DRA 2 at which the OSNRtotal is maximum is beforehand calculated, and held as a control target value for the output level of the DRA 2 in the node 1. The pumping light power of the DRA 2 is controlled according to a result of comparison between the control target value and a monitor value of the output level of the DRA 2, whereby the node 1 can be operated under the optimum OSNR condition at all times including from a start of the node 1 (when the power source is turned on) to during the operation.

(B) Examples of Materialization

Hereinafter, description will be made of examples of materialization of such the OSNR adaptive control.

(B1) Example of Materialization 1

Figure 4:
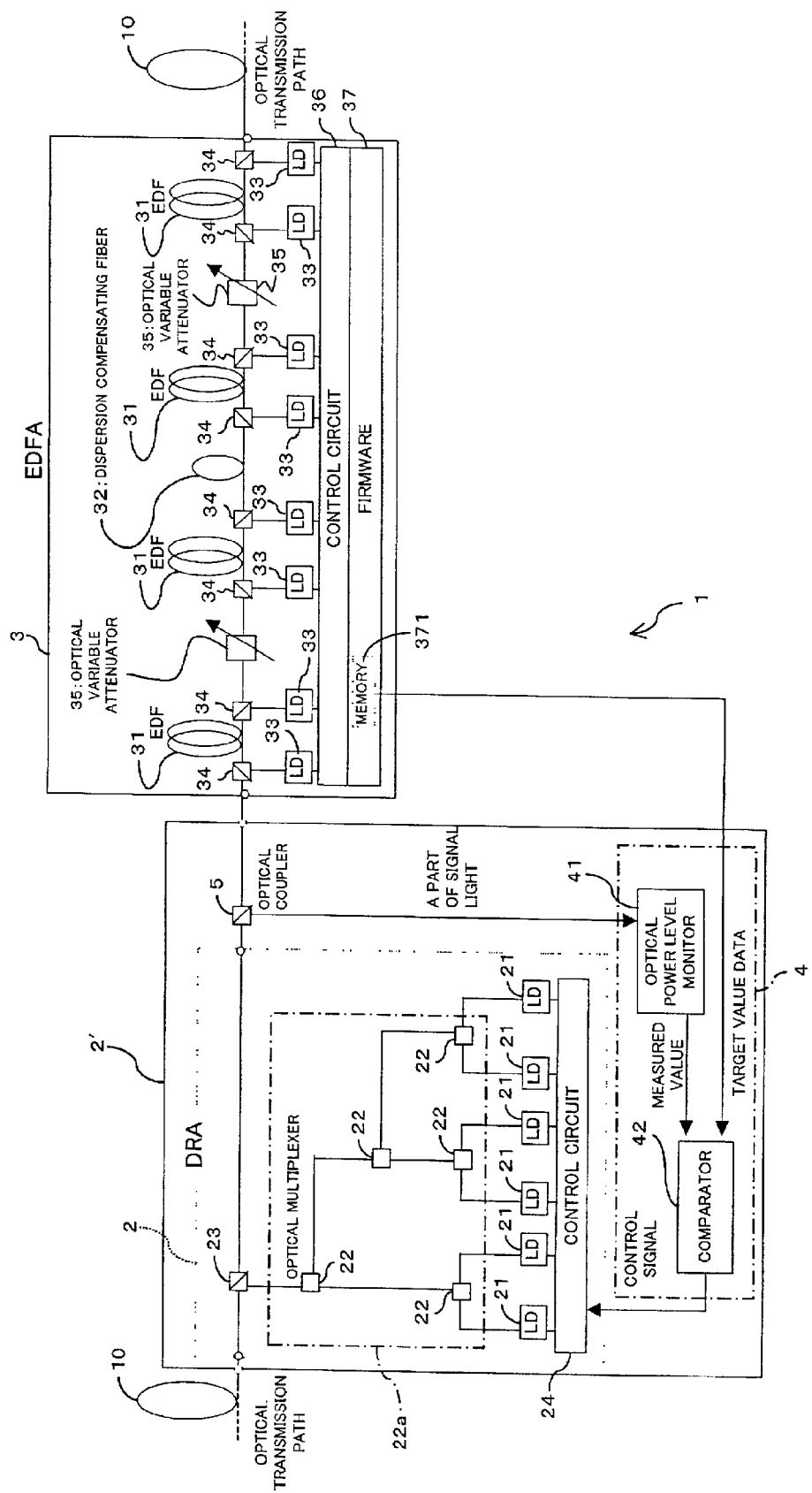
FIG. 4 is a block diagram showing an example of materialization 1 of an optical regenerator materializing an OSNR adaptive control according to the embodiment.
Figure 11:
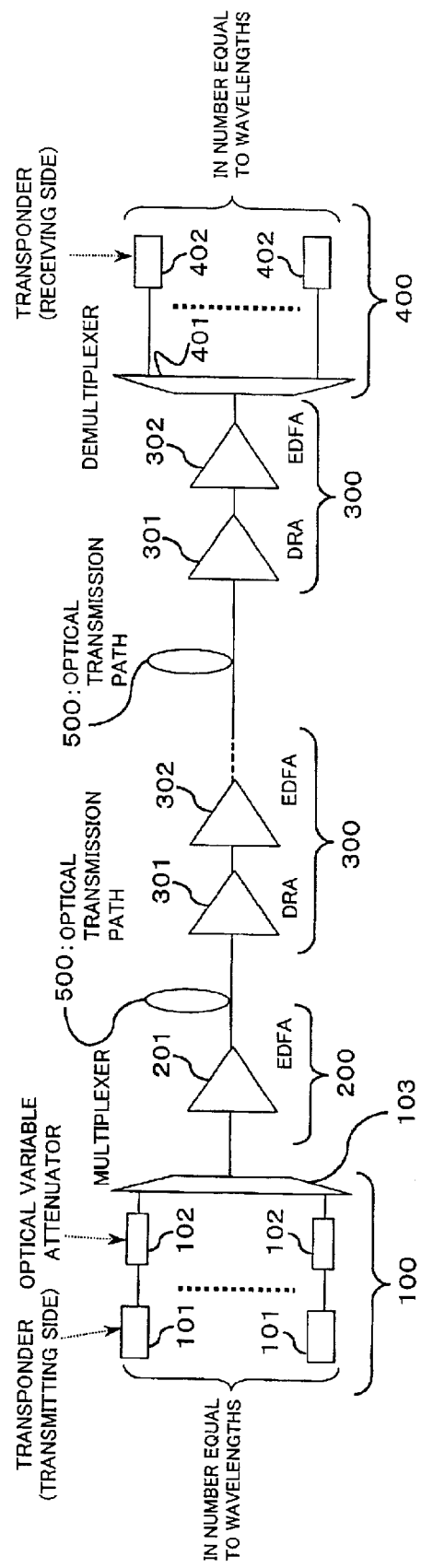
FIG. 11 is a block diagram showing an example of structure of a known WDM transmission system.

The node 1 according to this embodiment is configured as shown in, for example, FIG. 4. The node 1 shown in FIG. 4 comprises a DRA module 2' having a DRA 2, a gain control unit 4 realizing the above comparing controlling function and an optical demultiplexer (optical coupler) for monitoring 5 branching a part of an output optical signal of the DRA 2 as a monitor light signal to the gain control unit 4, and an EDFA 3. Incidentally, this node 1 is applied to the WDM transmission system shown in, for example, FIG. 11 at the same position as the regenerator 200 or 300.

The DRA 2 comprises pumping sources (laser diodes: LDs) 21 in number that can cover a bandwidth of a WDM signal inputted from the optical transmission path 10, a plurality of optical multiplexers (optical couplers) 22 configuring an optical multiplexing unit 22a for multiplexing wavelengths of optical signals each at a predetermined wavelength band generated in the corresponding LD 21, an optical coupler for Raman amplification 23 for coupling (counterpropagating pumping) an optical signal wavelength-multiplexed by the optical multiplexing unit 22a as pumping light for Raman amplification to the optical transmission path 10 on the input's side, and a control circuit 24 being able to control each pumping light power of the LD 21 at each predetermined wavelength band according to a control signal from the gain control unit 4.

On the other hand, the EDFA 3 comprises, in the structure shown in FIG. 4, EDFs 31 for four stages, a dispersion compensating fiber (DCF) 32 interposed between the second and third EDFs 31 from the input's side, optical couplers 34 disposed on the input's side and the output's side of each of the EDFs 31, a plurality of pumping sources (LDs) 33 generating pumping light at predetermined wavelengths to be inputted from the input's side and the output's side of each of the EDFs 31 via the optical couplers 34, optical variable attenuators 35 interposed between the first and second stages, and between the third and the fourth stages from the input's side, and a control circuit (hardware) 36 being able to control individual pumping powers of the LDs 33 according to control software provided as firmware 37. A control target value relating to an output level of the DRA 2 beforehand calculated as above is held in a memory (control target value storing unit) 371 in the firmware 37.

The optical variable attenuators 35 are provided in order to adjust a level of a whole input WDM signal to an optimum level in consideration that a wavelength dependent tilt generates when an input WDM signal is amplified by the EDF 31, and the DCF 32 has a limitation of an input optical signal level. Why the above control target value is stored in the memory 371 in the EDFA 3 is to cope with a case where an EDFA 3 having a different NF is applied.

Namely, when an EDFA 3 having a different NF is applied, the firmware 37 re-calculates the above control target value on the basis of an NF of the EDFA 3, and the memory 371 stores it. Whereby, even if any EDFA 3 is applied, it is possible to automatically obtain an optimum control target value for a combination of the EDFA 3 and the DRA 2. The firmware 37 in this case fulfils a function as a control target value calculating means which calculates the above control target value for each of the EDFA 3 having a different NF on the basis of an NF of the EDFA 3 and an NF of the DRA 2, and stores it in the memory 37.

The gain control unit 4 comprises an optical power level monitoring unit 41 which monitors a level (power) of a part (monitor light) of a WDM signal branched from the above optical coupler for monitoring 5, and a comparator 42 which compares a level of monitor light (DRA output) monitored by the optical power level monitoring unit 41 (hereinafter simply referred as "monitoring unit 41") with the control target value held in the above memory 371, and supplies a result of comparison (difference) as a control signal to the control circuit 24 in the DRA 2.

Each of pumping light powers of the LDs 21 in the DRA 2 is so adaptively controlled by the control circuit 24 that a DRA output level monitored by the optical power level monitoring unit 41 finally becomes the control target value (the above difference becoming minimum), an input optical signal level to the EDFA 3 is optimized, and an OSNR of the whole node 1 is optimized.

In initial setting (at the time of start of the apparatus), the gain control unit 4 sets each of initial pumping light powers of the LDs 21 on the basis of only the control target value in the memory 371.

In this example, the gain control unit 4 and the firmware 37 (memory 371) accomplish a function as a controlling means which so adaptively controls an amplification gain of the DRA 2 that quality of an optical signal outputted from the EDFA 3 becomes maximum. The gain control unit 4 fulfils a function as a first gain control unit which sets an amplification gain of the DRA 2 on the basis of the control target value in the memory 371.

With the above structure, in the node 1 in this example, the gain control unit 4 so controls an amplification gain (pumping light power) of the DRA 2 that quality of an output optical signal of the EDFA 3 becomes maximum. Although the input level of an optical signal to the EDFA 3 is not always constant unlike a case where the amplification gain of the DRA 2 is so controlled that the output optical signal level of the EDFA 3 is always constant, it is possible to optimize the final OSNR of the node 1.

The gain control unit 4 can accomplish optimization of the OSNR of the whole node 1 by a simple control in which an amplification gain of the DRA 2 is set on the basis of the above control target value beforehand determined on the basis of NFs of the DRA 2 and the EDFA 3. Additionally, the gain control unit 4 can always keep the output optical signal level of the DRA 2 at an optimum value at which the output optical signal quality of the EDFA 3 is maximum even after the above setting of the amplification gain, using an adaptive (feedback) control on a pumping light power obtained by comparing a monitor value of the DRA output level with the control target value, even after the above setting of the amplification gain.

Accordingly, a gain control that can optimize the OSNR of the whole node 1 from the time of initial setting to the time of operation can be realized with a simple structure, the apparatus size and the cost of the gain control unit 4, further the node 1 can be decreased.

When an EDFA 3 having a different NF is applied, the firmware 37 calculates an optimum control target value for a combination of that EDFA 3 and the DRA 2. Even when an EDFA 3 having a different NF is applied, it is possible to automatically optimize the OSNR of the whole node 1, which largely contributes to improvement of flexibility in configuring the system.

Figure 5:
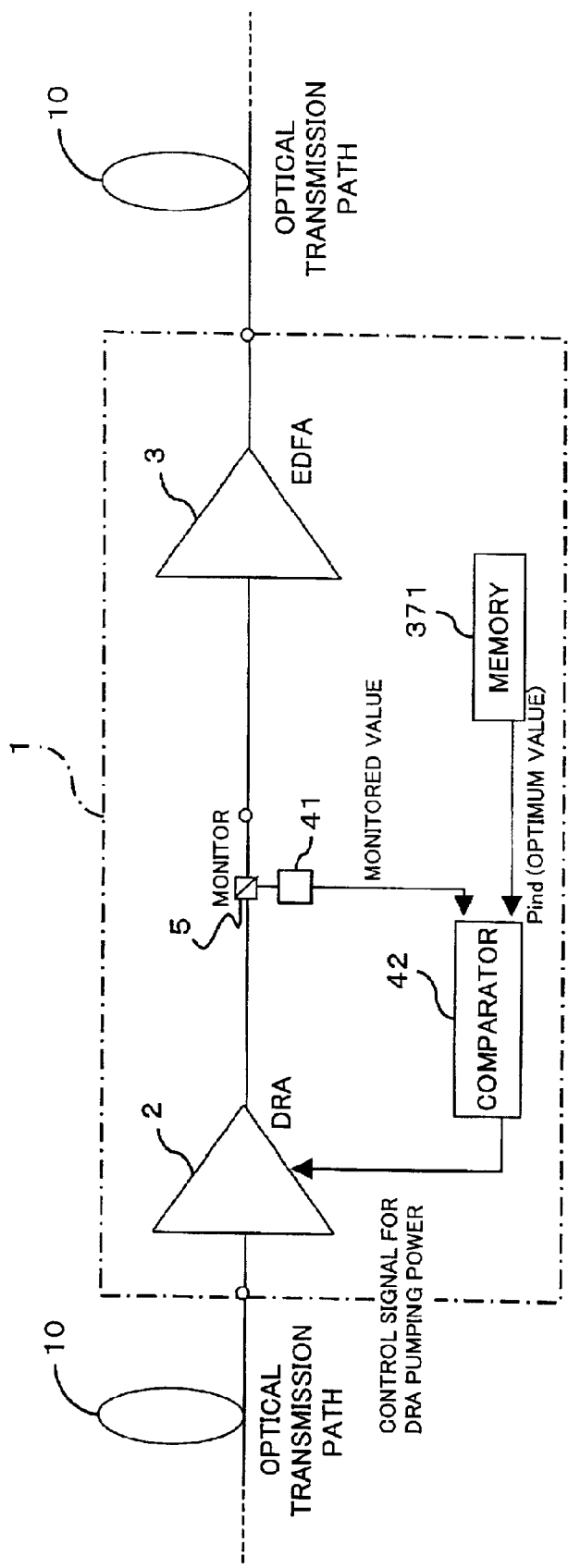
FIG. 5 is a block diagram showing an example of another structure of the optical regenerator shown in FIG. 4.

Meanwhile, when it is unnecessary to re-calculate a control target value for each of applied EDFAs 3, that is, when NFs of the applied EDFAs 3 are equal, for example, it is unnecessary to always provide the memory 371 to the EDFA 3, but the memory 371 may be disposed at any position in the node 1 (refer to FIG. 5).

(B2) Example of Materialization 2

Figure 6:
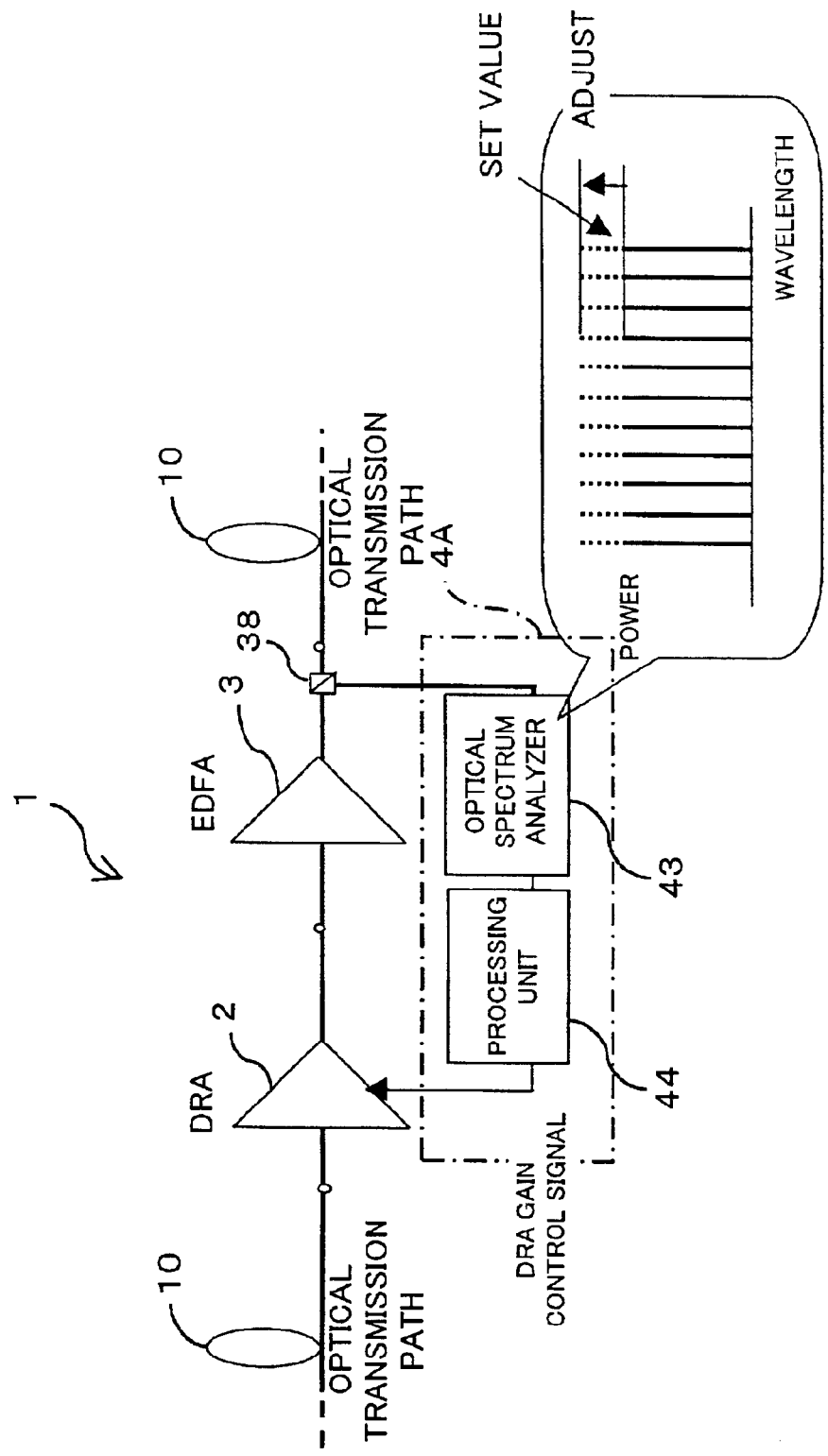
FIG. 6 is a block diagram showing an example of materialization 2 of an optical regenerator materializing the OSNR adaptive control according to the embodiment.

Alternatively, the adaptive control on the OSNR of the whole node 1 described above may be realized with a structure as shown in FIG. 6. Namely, there are provided a gain control unit 4A having an optical spectrum analyzer 43 and a processing unit 44, and an optical coupler for monitoring 38 which branches a part of an output WDM signal of the EDFA 3, and inputs it as monitor light to the above optical spectrum analyzer 43. The structures of the DRA 2 and the EDFA 3 may be the same as the structures shown in FIG. 4.

The above optical spectrum analyzer (optical signal-to-noise ratio monitoring unit) 43 can analyze a signal level and a noise level of a WDM signal for each wavelength, and measure (monitor) an OSNR of the WDM signal for each wavelength. The processing unit 44 gives a gain control signal to the control circuit 24 of the DRA 2 to control (dither) a pumping light power (amplification gain) of the DRA 2, and adjusts the pumping light power of the DRA 2 to a value at which an average value of the OSNR at each wavelength measured by the optical spectrum analyzer 43 is maximum.

In this example, the optical spectrum analyzer 43 fulfils a function as an optical signal quality monitoring unit which monitors quality of an output optical signal of the EDFA 3, whereas the gain control unit 4A fulfils a function as a second gain control unit which controls an amplification gain of the DRA 2 so that quality of an output optical signal of the EDFA 3 monitored by the optical spectrum analyzer 43 becomes maximum.

With the above structure, in the node 1 in this example, the amplification gain (output optical signal level) of the DRA 2 is so adaptively controlled on the basis of an actual OSNR of the EDFA 3 measured (monitored) by the optical spectrum analyzer 43 that the OSNR becomes maximum, and optimized. Accordingly, even at the time of initial setting of an amplification gain of the DRA 2 (when the apparatus is started) and in the operative condition thereafter, it is possible to optimize the OSNR of the whole node 1.

Such the ONSR adaptive control is carried out in each node 1 in the WDM transmission system, whereby the whole system can be operated in the best OSNR condition.

When the apparatus is started, the method in "example of materialization 1" described above may be applied. Namely, when the apparatus is started, a pumping light power of the DRA 2 is such set as to be a control target value of the amplification gain beforehand calculated on the basis of the NF of the DRA 2 and the NF of the EDFA 3, after that, the pumping light power is such adaptively controlled on the basis of an OSNR actually measured as above of an output optical signal of the EDFA 3 that the OSNR becomes maximum.

In this case, a start point of dithering by the gain control unit 4A becomes the above control target value, so that a width of dithering can be decreased, and the OSNR of the whole node 1 can be set to the optimum condition at a high speed.

(B3) Example of Materialization 3

Figure 7:
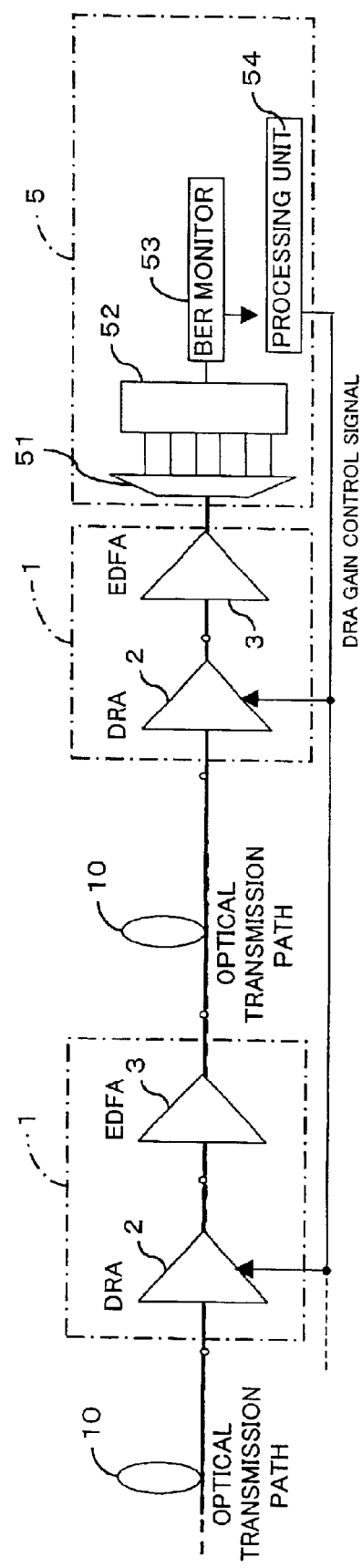
FIG. 7 is a block diagram showing an example of materialization 3 of an optical regenerator materializing the OSNR adaptive control according to the embodiment.

As another example of materialization of the OSNR adaptive control, as shown in, for example, FIG. 7, an optical receiving terminal 5 of the WDM transmission system may comprise a BER monitoring unit 53 which monitors a bit error rate (BER) of an optical signal at each wavelength (channel) of a received WDM signal, and a processing unit 54 which gives a gain control signal to the control unit 24 of the DRA 2 in each node 1 to control (dither) a pumping light power (amplification gain) of the DRA 2, and such adjusts the pumping light power of the DRA 2 in each node 1 that a BER monitored by the BER monitoring unit 53 becomes minimum (namely, quality of a received WDM signal becoming maximum).

In the case of this example, the BER monitoring unit 53 functions as an optical signal quality monitoring unit which monitors quality of a received WDM signal, whereas the processing unit 54 functions as a control unit which such controls an amplification gain of the DRA 2 in the node 1 that quality of the received WDM signal monitored by the BER monitoring unit 53 as the optical signal quality monitoring unit becomes maximum. In the optical receiving terminal 5, reference character 51 designates an optical demultiplexer which demultiplexes the received WDM signal into optical signals at respective wavelengths (channels), and reference character 52 designates an optical receiver which performs a receiving process or the like to converts optical signals at respective wavelengths from the optical demultiplexer 51 into electric signals.

In the WDM transmission system in this example, an amplification gain (output optical signal level) of the DRA 2 in each node 1 positioning on the upstream side is adaptively controlled and optimized such that an actual BER of a received WDM signal monitored by the BER monitoring unit 53 in the optical receiving terminal 5 becomes minimum. The order in which the control should be carried out on the nodes 1 may be from a node 1 on the downstream side, or may be simultaneously.

Even at the time of initial setting of the amplification gain of the DRA 2 (when the apparatus is started) and in the operating condition thereafter, it is possible to optimize an OSNR of the whole WDM transmission system, and operate the whole system under the best OSNR condition.

Since the optical receiving terminal 5 intensively carries out the pumping light power control on the DRA 2 in each node 1 in this case, it is unnecessary to provide the OSNR adaptive control function to each node 1 like the above example of materialization, so that it is possible to simplify each node 1 and decrease the cost of the same, and decrease the size and cost of the whole WDM transmission system.

Alternatively, the OSNR adaptive control by the above BER monitoring may be carried out independently on each node 1. However, it is not practical since a work of once converting an optical signal into an electric signal for the BER monitoring in each node 1, after that, again converting the electric signal into an optical signal becomes necessary.

When the apparatus (system) is started, the method in the above "example of materialization 1" may be applied. Namely, when the apparatus is started, the pumping light power of the DRA 2 is such set as to be a control target value of the amplification gain of the DRA 2 beforehand calculated on the basis of the NF of the DRA 2 and the NF of the EDFA 3 in each node 1, after that, a pumping light power of the DRA 2 in each node is adaptively controlled on the basis of a BER of a received WDM signal actually measured by the optical receiving terminal 5 as above such that the BER becomes minimum.

Since a start point of dithering by the processing unit 54 becomes the above control target value in this case as well, it is possible to decrease the dithering width, and to set the OSNR of each node 1, and further the whole system to the optimum condition at a high speed.

Figure 8:
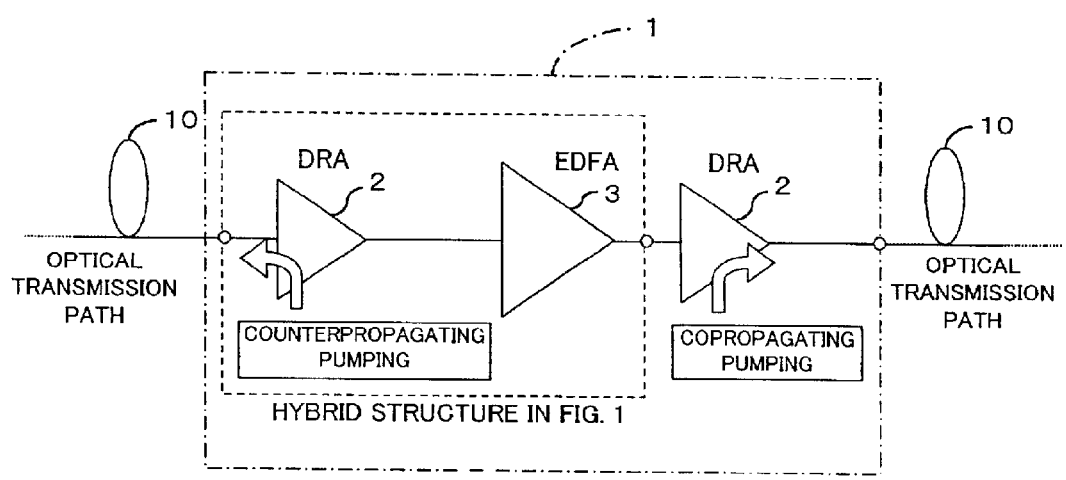
FIG. 8 is a block diagram showing another structure of the optical regenerator shown in FIGS. 1 and 4 through 7.
Figure 9:
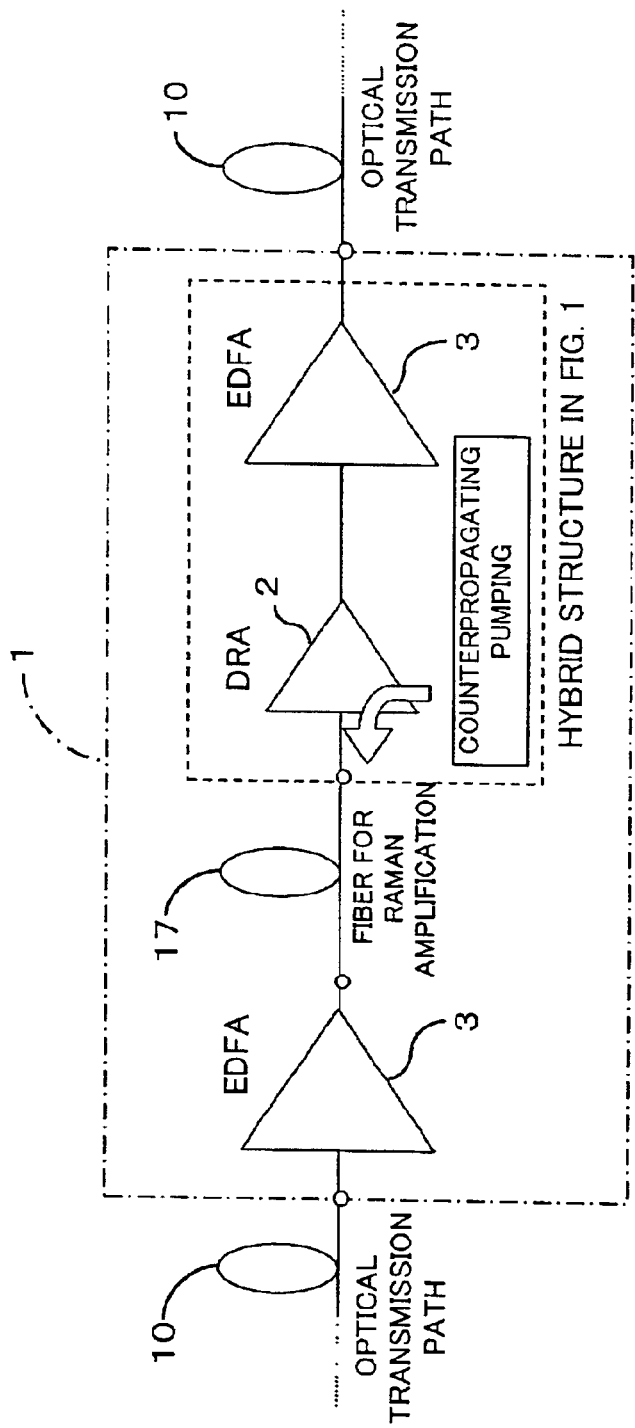
FIG. 9 is a block diagram showing another structure of the optical regenerator shown in FIGS. 1 and 4 through 7.

In each of the above examples of materialization 1 through 3, one DRA 2 (counterpropagating pumpig type) and one EDFA 3 are provided in the node 1. However, the node 1 may be provided with DRAs 2 of a copropagating pumping type and a counterpropagating pumping type, and an EDFA 3 disposed between these DRAs 2 as shown in FIG. 8, or two EDFAs 3 and one DRA 2 (reference numeral 17 designating a fiber for Raman amplification). In which case, if the OSNR adaptive control similar to the above is carried out on the DRA 2 configuring the hybrid structure shown in FIG. 1, it is possible to optimize the OSNR of the whole node 1.

(C) Position at Which a Dispersion Compensating Fiber (DCF) is to be Disposed

Hereinafter, description will be made of a position at which the DCF is to be disposed in the node 1.

In the WDM transmission system, dispersion compensation is generally performed in each node 1 in order to compensate wavelength dispersion due to the optical transmission path 10. This compensation is generally carried out using a dispersion compensating fiber (DCF), an appropriate DCF being disposed in each node 1.

However, the DCF is an optical fiber, having a specific loss value like the optical transmission path 10. For this, the DCF is basically a factor degrading the OSNR in the node 1. In a hybrid optical amplifier structure in which the DRA 2 and the EDFA 3 are combined, a level diagram of an optical signal in the node 1 is largely different from that in the node structure configured with only the EDFA 3. Therefore, it is not always most suitable to insert a DCF between stages of EDFs as before from a viewpoint of OSNR.

Figure 10:
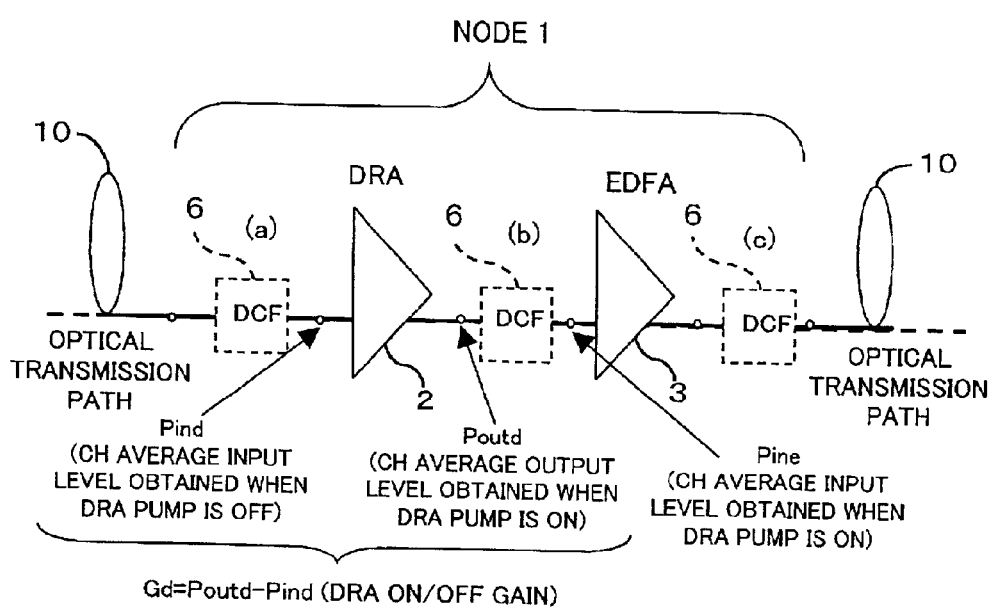
FIG. 10 is a block diagram showing a structure of an optical regenerator in order to illustrate positions at which the DCF is to be disposed according to the embodiment.

Here is examined an optimum position of a DCF, by which an OSNR generating in the whole node 1 can be optimized. An example of structure of the node 1 used in this examination is shown in FIG. 10. In the case of a node structure shown in FIG. 10, there are roughly three positions (positions designated by (a) to (c) in FIG. 10) at which a DCF is to be disposed. Here, an OSNR of the whole node 1 in the case where the DCF 6 is disposed at each of (a) to (c) is calculated, with a DCF loss value being Ldcf.

When the DCF 6 is disposed at a position (a) shown in FIG. 10, that is, in the front stage of the DRA 2, pumping light of the DRA 2 is inputted to the DCF 6, thus a Raman gain generates inside the DCF 6. As a result, the gain and NF of the DRA 2 in the above equation (6) change. When the gain and NF are assumed to be Gd' and NF'd, respectively:

$$OSNRtotal = -10log\ [10^{-\{(Pind-NFd(Gd')-10\ log(h\cdot v\cdot\Delta f)/10)\}} + 10^{-\{(Pind+Gd'-NFe(Pind+Gd')-10\ log(h\cdot v\cdot\Delta f)/10)\}}]\ [dB] \qquad (7)$$

Since a non-linear factor of the DCF 6 is large, the Raman efficiency becomes larger than the optical transmission path 10. This signifies that not only the Raman gain Gd but also the noise figure NFd becomes larger.

On the other hand, when the DCF 6 is disposed at a position (b) shown in FIG. 10, that is, between the DRA 2 and the EDFA 3:

$$OSNRtotal = -10log\ [10^{-\{(Pind-NFd(Gd)-10\ log(h\cdot v\cdot\Delta f)/10)\}} + 10^{-\{(Pind+Gd-Ldcf-NFe(Pind+Gd-Ldcf)-10\ log(h\cdot v\cdot\Delta f)/10)\}}]\ [dB] \qquad (8)$$

Similarly, when the DCF 6 is disposed at a position (c) shown in FIG. 10, that is, in the rear stage of the EDFA 3:

$$OSNRtotal = -10log\ [10^{-\{(Pind-Ldcf-NFd(Gd)-10\ log(h\cdot v\cdot\Delta f)/10)\}} + 10^{-\{(Pind-Ldcf+Gd-NFe(Pind-Ldcf+Gd)-10\ log(h\cdot v\cdot\Delta f)/10)\}}]\ [dB] \qquad (9)$$

When these equations (7) to (9) are compared, a structure in which the DCF 6 is disposed at the position (a) where the DCF loss can be compensated is effective when the DCF loss value is extremely large. When the DCF loss value is relatively small, a structure in which the DCF 6 is disposed at the position (b) or (c) is effective.

In concrete, consideration is here made on under what conditions each of the structures of the above position (a), (b) and (c) is the most advantageous from a viewpoint of OSNR. First, a structure of the position (b) and a structure of the position (c) are compared.

Assuming that OSNRd in an arrangement at the position (b) is expressed as OSNRd(b), whereas OSNRd in an arrangement of the position (c) is expressed as OSNRd(c), from the equations (8) and (9):

$$\begin{aligned}OSNRd(b) - OSNRd(c) &= (Pind - NFd(Gd) - \\ &\quad 10\log(h \cdot v \cdot \Delta f)) - \\ &\quad (Pind - Ldcf - NFd(Gd) - \\ &\quad 10\log(h \cdot v \cdot \Delta f)) \\ &= Ldcf \ [dB]\end{aligned} \quad (10)$$

$$\begin{aligned}OSNRe(b) - OSNRe(c) &= (Pind + Gd - Ldcf - NFe(Pind + \\ &\quad Gd \cdot Ldcf) - 10\log(h \cdot v \cdot \Delta f)) - \\ &\quad (Pind - Ldcf + Gd - NFe(Pind - \\ &\quad Ldcf + Gd) - 10\log(h \cdot v \cdot \Delta f)) \\ &= 0 \ [dB]\end{aligned} \quad (11)$$

Since Ldcf>0, from the equation (10):

$$OSNRd(b) > OSNRd(c) \quad (12)$$

When the structure in which the DCF 6 is disposed at the position (b) is compared with the structure in which the DCF 6 is disposed at the position (c) on the basis of the equations (11) and (12), it is seen that the structure in which the DCF 6 is disposed at the position (b) is always advantageous from a viewpoint of OSNR.

When the structure in which the CDF 6 is disposed at the position (a) and the structure in which the DCF 6 is disposed at the position (c) are compared, from the above equations (7) and (9):

$$\begin{aligned}OSNRd(a) - OSNRd(c) &= (Pind - NF'd(Gd') - \\ &\quad 10\log(h \cdot v \cdot \Delta f)) - \\ &\quad (Pind - Ldcf - NFd(Gd) - \\ &\quad 10\log(h \cdot v \cdot \Delta f)) \\ &= Ldcf - (NF'd(Gd') - \\ &\quad NFd(Gd)) \ [dB]\end{aligned} \quad (13)$$

$$\begin{aligned}OSNRe(a) - OSNRe(c) &= (Pind + Gd' - NFe(Pind + \\ &\quad Gd') - 10\log(h \cdot v \cdot \Delta f)) - \\ &\quad (Pind - Ldcf + Gd - NFe(Pind - \\ &\quad Ldcf + Gd) - 10\log(h \cdot v \cdot \Delta f)) \\ &= Ldcf + (Gd' - Gd) - (NFe(Pind + \\ &\quad Gd') - NFe(Pind \cdot Ldcf + \\ &\quad Gd)) \ [dB]\end{aligned} \quad (14)$$

A value of Ldcf is at least not less than 2.0 dB if the DCF 6 is for SMF (Single Mode Fiber) whose transmission path length is about several tens of kilometers, for example, which is generally a larger value than an increased quantity of NFd due to the DCF 6. Therefore, $$Ldcf > (NF'd(Gd') - NFd(Gd)) \quad (15)$$

From the equation (13):

$$OSNRd(a) > OSNRd(c) \quad (16)$$

When considering that a tilt (NFe(x)/x) of NFe(x) is not larger than +1 dB/+1 dB:

$$Gd' - Gd > NFe(Gd') - NFe(Gd) \quad (17)$$

From this and the characteristic of NFe shown in FIG. 2(B):

$$Gd' - Gd > NFe(Pind + Gd') - NFe(Pind - Ldcf + Gd) \quad (18)$$

From this and Ldcf>0, a value of the equation (14) becomes positive. Therefore:

$$OSNRe(a) > OSNRe(c) \quad (19)$$

From the equation (16) and the equation (19), it is seen that it is more advantageous from the viewpoint of OSNR to dispose the DCF 6 at the position (a).

Next, when the position (a) and the position (b) are compared, that is, when the equation (7) and the equation (8) are compared:

$$OSNRd(a) - OSNRd(b) = -(NF'd(Gd') - NFd(Gd)) \ [dB] \quad (20)$$

$$OSNRe(a) - OSNRe(b) = Ldcf + (Gd' - Gd) - (NFe(Pind + Gd') - NFe(Pind + Gd - Ldcf)) \ [dB] \quad (21)$$

In the equations (20) and (21), each term other than Ldcf is a difference between NF and Gd. When Ldcf is extremely large, Ldcf becomes dominant. At this time, if an OSNR (=OSNRe) generating in the EDFA 3 is dominant in an OSNR (=OSNRtotal) generating in the whole node 1, it can be considered that OSNRtotal(a)-OSNRtotal(b)>0. Accordingly, it is more advantageous that the DCF 6 is disposed at the position (a).

In order to suppress degradation of OSNR due to the DCF 6, it is effective that the DCF loss is decreased by the amplification gain as much as possible. For this, when the DCF loss is extremely large, the structure of the position (a) by which the DCF loss can be compensated by a gain of the DRA 2 is more effective. On the contrary, when Ldcf is small, the position (b) is sometimes more advantageous.

The DCF 6 can be divided and disposed at a plurality of positions among the above positions (a) to (c), thereby to optimize an OSNR generating in the whole node 1. Namely, it is possible to appropriately combine a plurality of positions: the position (a) and the position (b), or the position (b) and the position (c), for example. It is possible to select any combination so long as the OSNR of the whole node 1 becomes optimum.

That one DCF 6 is divided into two and disposed at the position (a) and the position (b) is considered to be advantageous since the position (c) is not superior from a viewpoint of OSNR over the position (a) or the position (b) from a result of the above examination. When the DCF 6 is divided as this, the gain of the DRA 2 becomes smaller than the gain Gd' of the DRA 2 not divided. This is expressed as Gd". When losses of divided DCFs (hereinafter referred as divided DCFs) are expressed as Ldcf(a) and Ldcf(b), an OSNR (=OSNRd) generating in the DRA 2 and an OSNR (=OSNRe) generating in the EDFA 3 are as follows:

$$OSNRd = Pind - NF''d(Gd'') - 10\log(h \cdot v \cdot \Delta f) \ [dB] \quad (22)$$

$$OSNRe = Pind + Gd'' - Ldcf(b) - NFe(Pind + Gd'' - Ldcf(b)) - 10\log(h \cdot v \cdot \Delta f) \ [dB] \quad (23)$$

When a loss Ldcf(a) of a divided DCF disposed at the position (a) is increased, a value of the equation (22) becomes smaller since a gain Gd" of the DRA 2 is increased. When the loss Ldcf(a) of the divided DCF disposed at the position (a) is increased, the loss Ldcf(b) of a divided DCF disposed at the position (b) is decreased since a total of dispersion compensation quantity does not change.

At this time, when a tilt (NFe(x)/x) of NFe(x) is not larger than +1 dB/+1 dB, a value of the equation (23) becomes larger. As a result, the optimum rate of distribution of the position (a) and the position (b) is not constant, but the optimum distribution is considered to be determined according to the noise characteristic NFe of the EDFA 3, the noise characteristic NFd of the DRA 2 and the like. It seems sometimes more advantages depending on the conditions that the DCF 6 is divided into three and disposed at the positions (a) to (c).

As above, the DCF 6 (divided DCFs) is disposed at a position (at least the position (a) or the position (b), or the both), at which the OSNR (that is, the OSNR of the whole node 1) of the EDFA 3 is maximum, determined on the basis of an NF of the DRA 2 and an NF of the EDFA 3, among the position (a) (in the front stage of the DRA 2), the position (b) (between the DRA 2 and the EDFA 3) and the position (c) (in the rear stage of the EDFA 3), whereby the OSNR of the whole node 1 can be optimized.

(D) Others

In the above embodiment, the DRA 2 is applied as a first optical amplifier, whereas the EDFA 3 is applied as a second optical amplifier. However, optical amplifiers having the same NFs as the DRA 2 and the EDFA 3, respectively, may be applied in the same manner, and provide the same functions and effects.

The present invention is not limited to the above examples, but may be modified in various ways without departing from the scope of the invention.

What is claimed is:

1. An optical transmitting apparatus comprising:
   a first optical amplifier amplifying a wavelength division multiplexed (WDM) optical signal to thereby output an output optical signal by which quality is changed, independent of a number of WDM channels in the WDM optical signal, according to amplification gain of the first optical amplifier;
   a second optical amplifier amplifying the output optical signal from the first optical amplifier, to thereby output a WDM optical signal from the second optical amplifier having quality changed according to an input level to the second optical amplifier of the output optical signal from the first optical amplifier; and
   a controller for performing an adaptive control on the amplification gain of the first optical amplifier so that average quality per WDM channel of the WDM optical signal output from the second optical amplifier becomes maximum.

2. The optical transmitting apparatus according to claim 1, wherein said controller comprises:
   a control target value storing unit for storing an output optical signal level of said first optical amplifier, at which quality of the output WDM optical signal of said second optical amplifier is maximum, beforehand determined as a control target value on the basis of a gain-to-noise characteristic of said first optical amplifier and an input level-to-noise characteristic of said second optical amplifier; and
   a first gain control unit for setting the amplification gain of said first optical amplifier on the basis of the control target value of said control target value storing unit.

3. The optical transmitting apparatus according to claim 2, wherein said first gain control unit comprises:
   a level monitoring unit for monitoring an output optical signal level of said first optical amplifier; and
   a comparing unit for comparing the control target value of said control target value storing unit with an output optical signal level of said first optical amplifier monitored by said level monitoring unit;
   thereby controlling the amplification gain of said first optical amplifier so that a result of comparison by said comparing unit becomes minimum.

4. The optical transmitting apparatus according to claim 3, wherein said controller comprises:
   a control target value calculating means for calculating the control target values for each of second optical amplifiers having a different input level-to-noise characteristic on the basis of the gain-to-noise characteristic of said first optical amplifier and the input level-to-noise characteristic of said second optical amplifier, and storing the control target values in said control target value storing unit.

5. The optical transmitting apparatus according to claim 4, further comprising:
   a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

6. The optical transmitting apparatus according to claim 3, further comprising:
   a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

7. The optical transmitting apparatus according to claim 2, wherein said controller comprises:
   a control target value calculating means for calculating the control target values for each of second optical amplifiers having a different input level-to-noise characteristic on the basis of the gain-to-noise characteristic of said first optical amplifier and the input level-to-noise characteristic of said second optical amplifier, and storing the control target values in said control target value storing unit.

8. The optical transmitting apparatus according to claim 7, further comprising:
   a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

9. The optical transmitting apparatus according to claim 2, wherein said controller comprises:
   an optical signal quality monitoring unit for monitoring quality of the output WDM optical signal of said second optical amplifier; and
   a second gain control unit for controlling the amplification gain of said first optical amplifier so that quality of the output WDM optical signal of said second optical amplifier monitored by said optical signal quality monitoring unit becomes maximum.

10. The optical transmitting apparatus according to claim 9, wherein said optical signal quality monitoring unit is configured as an error rate monitoring unit for monitoring an error rate of the output WDM optical signal of said second optical amplifier; and said second gain control unit controls the amplification gain of said first optical amplifier so that the error rate monitored by said error rate monitoring unit becomes minimum.

11. The optical transmitting apparatus according to claim 10, further comprising:

a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

12. The optical transmitting apparatus according to claim 9, wherein said optical signal quality monitoring unit is configured as an optical signal-to-noise ratio (OSNR) monitoring unit for monitoring an OSNR of the output WDM optical signal of said second optical amplifier; and said second gain control unit controls the amplification gain of said first optical amplifier so that the OSNR monitored by said OSNR monitoring unit becomes maximum.

13. The optical transmitting apparatus according to claim 12, wherein said OSNR monitoring unit is configured with an optical spectrum analyzer.

14. The optical transmitting apparatus according to claim 13, further comprising:

a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

15. The optical transmitting apparatus according to claim 2, further comprising:

a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

16. The optical transmitting apparatus according to claim 9, further comprising:

a dispersion compensator compensating wavelength dispersion of the wavelength-multiplexed optical signal and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

17. The optical transmitting apparatus according to claim 12, further comprising:

a dispersion compensator compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

18. The optical transmitting apparatus according to claim 1, wherein said controller comprises:

an optical signal quality monitoring unit for monitoring quality of the output WDM optical signal of said second optical amplifier; and a second gain control unit for controlling the amplification gain of said first optical amplifier so that quality of the output WDM optical signal of said second optical amplifier monitored by said optical signal quality monitoring unit becomes maximum.

19. The optical transmitting apparatus according to claim 18, wherein said optical signal quality monitoring unit is configured as an error rate monitoring unit for monitoring an error rate of the output WDM optical signal of said second optical amplifier; and said second gain control unit controls the amplification gain of said first optical amplifier so that the error rate monitored by said error rate monitoring unit becomes minimum.

20. The optical transmitting apparatus according to claim 19, further comprising:

a dispersion compensator for compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

21. The optical transmitting apparatus according to claim 18, wherein said optical signal quality monitoring unit is configured as an optical signal-to-noise ratio (OSNR) monitoring unit for monitoring an OSNR of the output WDM optical signal of said second optical amplifier; and said second gain control unit controls the amplification gain of said first optical amplifier so that the OSNR monitored by said OSNR monitoring unit becomes maximum.

22. The optical transmitting apparatus according to claim 21, wherein said optical signal-to-noise ratio monitoring unit is configured with an optical spectrum analyzer.

23. The optical transmitting apparatus according to claim 22, further comprising:

a dispersion compensator for compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

24. The optical transmitting apparatus according to claim 18, further comprising:
a dispersion compensator for compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

25. The optical transmitting apparatus according to claim 21, further comprising:
a dispersion compensator for compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

26. The optical transmitting apparatus according to claim 1, further comprising:
a dispersion compensator for compensating wavelength dispersion and disposed at a position, at which quality of the output WDM optical signal of said second optical amplifier becomes maximum, beforehand determined on the basis of the gain-to-noise characteristic of said first optical amplifier and the input level-to-noise characteristic of said second optical amplifier, among a position in a front stage of said first optical amplifier, a position between said first optical amplifier and said second optical amplifier, and a position in a rear stage of said second optical amplifier.

27. The optical transmitting apparatus according to claim 26, wherein said dispersion compensator is disposed at least in the front stage of said first optical amplifier, or between said first optical amplifier and said second optical amplifier.

28. The optical transmitting apparatus according to claim 26, wherein said dispersion compensator is divided and disposed at a plurality of positions among a position in the front stage of said first optical amplifier, the position between said first optical amplifier and said second optical amplifier, and the position in a rear stage of said second optical amplifier.

29. The optical transmitting apparatus according to claim 28, wherein said dispersion compensator is divided and disposed at least in the rear stage of said first optical amplifier, and between said first optical amplifier and said second optical amplifier.

30. The optical transmitting apparatus according to claim 1, wherein said first optical amplifier is a Raman optical amplifier, and said second optical amplifier is a rare-earth-doped optical fiber amplifier.

31. An optical transmitting system in which an optical transmitter transmits an optical signal, an optical receiver receives the optical signal, and an optical regenerator regenerates the optical signal between said optical transmitter and said optical receiver, wherein
said optical regenerator comprises:
a first optical amplifier amplifying a wavelength division multiplexed (WDM) optical signal to thereby output an output optical signal by which quality is changed, independent of a number of WDM channels in the WDM optical signal, according to amplification gain of the first optical amplifier, and
a second optical amplifier amplifying the output optical signal from the first optical amplifier, to thereby output a WDM optical signal from the second optical amplifier having quality changed according to an input level to the second optical amplifier of the output optical signal from the first optical amplifier;
said optical receiver receives the WDM optical signal output from the second optical amplifier, and comprises:
an optical signal quality monitoring unit monitoring quality of individual WDM channels of the received WDM optical signal, and
a controller controlling the amplification gain of said first optical amplifier in said optical regenerator so that average quality per WDM channel of the received WDM optical signal monitored by said optical signal quality monitoring unit becomes maximum.

32. The optical transmitting system according to claim 31, wherein said first optical amplifier is a Raman optical amplifier, and said second optical amplifier is a rare-earth-doped optical fiber amplifier.

33. An apparatus comprising:
a first optical amplifier amplifying a wavelength division multiplexed (WDM) optical signal to thereby output an amplified WDM optical signal having quality changed, independent of a number of WDM channels in the WDM optical signal, in accordance with amplification gain of the first optical amplifier;
a second optical amplifier amplifying the amplified WDM optical signal output by the first optical amplifier, to thereby output a further amplified WDM optical signal from the second optical amplifier having quality changed in accordance with an input level to the second optical amplifier of the amplified WDM optical signal output by the first optical amplifier; and
a controller controlling the amplification gain of the first optical amplifier so that average quality per WDM channel of the further amplified WDM optical signal output by the second optical amplifier is maximized.

34. An apparatus as in claim 33, wherein the controller comprises:
a memory storing a predetermined target level of the amplified WDM optical signal output by the first optical amplifier at which quality of the further amplified WDM optical signal output by the second optical amplifier is maximized, the target level being predetermined in accordance with a gain-to-noise characteristic of the first optical amplifier and an input level-to-noise characteristic of the second optical amplifier; and
a gain controller setting the amplification gain of the first optical amplifier in accordance with the target level stored in the memory.

35. An apparatus as in claim 33, wherein the first optical amplifier is a Raman amplifier, and the second optical amplifier is an erbium doped fiber amplifier.

36. An apparatus as in claim 33, wherein the first optical amplifier is a distributed Raman amplifier, and the second optical amplifier is an erbium doped fiber amplifier.

37. An apparatus as in claim 34, wherein the first optical amplifier is a Raman amplifier, and the second optical amplifier is an erbium doped fiber amplifier.

38. An apparatus as in claim 34, wherein the first optical amplifier is a distributed Raman amplifier, and the second optical amplifier is an erbium doped fiber amplifier.

39. An apparatus comprising:

first amplification means for optically amplifying a wavelength division multiplexed (WDM) optical signal to thereby output an amplified WDM optical signal having quality changed, independent of a number of WDM channels in the WDM optical signal, in accordance with amplification gain of the first amplification means;

second amplification means for optically amplifying the amplified WDM optical signal output by the first amplification means, to thereby output a further amplified WDM optical signal from the second amplification means having quality changed in accordance with an input level to the second amplification means of the amplified WDM optical signal output by the first amplification means; and means for controlling the amplification gain of the first amplification means so that average quality per WDM channel of the further amplified WDM optical signal output by the second amplification means is maximized.

* * * * *

UNITED STATES PATENT AND TRADEMARK OFFICE
CERTIFICATE OF CORRECTION

PATENT NO. : 6,760,150 B2
DATED : July 6, 2004
INVENTOR(S) : Ryosuke Goto et al.

It is certified that error appears in the above-identified patent and that said Letters Patent is hereby corrected as shown below:

<u>Column 17,</u>
Line 34, delete "for".

Signed and Sealed this

Seventh Day of December, 2004

JON W. DUDAS
*Director of the United States Patent and Trademark Office*